3,394,203
XYLENE-FORMALDEHYDE-PHENOL RESIN AND A METHOD OF MAKING IT
Edgar C. Winegartner and Robert D. Wesselhoft, Baytown, Tex., assignors to Esso Research and Engineering Company
No Drawing. Filed May 21, 1965, Ser. No. 457,807
9 Claims. (Cl. 260—838)

ABSTRACT OF THE DISCLOSURE

Plywood adhesive composition comprising the reaction product of a xylene-formaldehyde condensate having an oxygen content of 13 to 17 wt. percent with phenol, at a phenol-to-condensation product weight ratio from 0.4 to 0.55.

---

The present invention relates to the manufacture of a superior resin having utility as a thermosetting plywood adhesive, as a binder for foundry cores, etc. In its more specific aspects, the present invention relates to the manufacture of a superior plywood adhesive, wherein the condensation product of xylene and formaldehyde is combined with a critical amount of phenol and is advanced to provide a non-water-based plywood adhesive. In another aspect, the present invention relates to an improved plywood adhesive which, by blending adhesives of disparate molecular weight, controls the penetration of the adhesive into the laminae of the plywood being produced.

The plywood industry now uses a phenol-formaldehyde resin as an adhesive for exterior grade, softwood plywoods. This resin, however, is employed in a water solution which has two deleterious effects. First, the water adds weight to the plywood without adding to the adhesive qualities of the phenol-formaldehyde resin, and, secondly, it limits the temperature at which the plywood can be pressed, and thus prolongs the cure time.

It has been found that certain xylene-formaldehyde resins can be employed as plywood adhesives if the xylene-formaldehyde resin is chosen to contain more than 13% oxygen and if it is "advanced" by reaction with sufficient phenol to give a phenol-to-xylene-formaldehyde weight ratio within the range of 0.4 to 0.55. The advantages of the adhesive of the present invention are numerous, the more important of which are as follows. First, by omitting the water, the weight of the boards is substantially reduced so that the shipping cost of the finished plywood is minimized. Secondly, the cost of the adhesive is reduced since two-thirds of the more expensive phenol constituent might be considered as being "replaced" by the less expensive xylene.

Further, in evaluating plywood adhesives, there are generally five variable factors which are employed as indicia. These factors are cure rate, adhesion of the cured product, assembly time, storage life, and spreadability. The adhesive of the present invention is comparable to the phenolic adhesives in cure rate, adhesion, and in spreadability. It is markedly superior in the aspects of assembly time and storage life.

In the use of a phenolic adhesive, the plywood must be assembled and pressed generally within 20 minutes (a maximum of 3 hours) after the glue has been spread. This requires pressing to be scheduled closely with respect to assembly. The adhesive of the present invention can be used at assembly times as long as 48 hours, and consistently good results can be obtained with an assembly time of 24 hours. This is important, since it means that the spreading operation need not be correlated directly with the pressing operation, but that boards which have been spread during one day's operation can be stacked, to be pressed on the following day.

In the area of storage life, the phenolic adhesive is manufactured with part of the caustic catalyst already present, and the catalyst will cause further reaction during storage, so that a maximum pot life of 6 months is expected. In warm summer weather this pot life may be as short as 3 weeks. In comparison, since the adhesive of the present invention is neutralized at the conclusion of the manufacturing step, an infinite pot life is obtained, the catalyst being added only at the time the adhesive is to be spread.

Basically, the present adhesive is the reaction product of a xylene-formaldehyde condensation product with a critical amount of phenol, with the resin being "advanced" to an optimum point and then neutralized. In order to obtain a satisfactory plywood adhesive, the xylene-formaldehyde condensation product must itself contain over 13 wt. percent oxygen, preferably from 13 ot 17 wt. percent. At oxygen contents lower than about 13 wt. percent in the base resin, the adhesive properties, when spread on plywood cores, were not satisfactory.

The xylene-formaldehyde condensation product may be obtained by the acid-catalyzed reaction of xylene and formaldehyde. The xylene may be o-, m-, or p-xylene or, preferably, as an admixture thereof with ethylbenzene, since this is an easily obtained refinery stream. The m-xylene is the most reactive component, followed by o-xylene. Formaldehyde may be employed as such, or as formalin, paraformaldehyde, trioxane, etc. Paraformaldehyde is preferred. The acid catalyst is preferably a 20 to 80 wt. percent aqueous sulfuric acid, although other acidic catalysts such as formic acid, trifluoroacetic acid, and aromatic sulfonic acids can also be used.

The relative proportions of xylene, formaldehyde, and acid are chosen to yield an acid/oil weight ratio of 0.02 to 10, and a xylene/formaldehyde mol ratio from 1 to 100.

The xylene and formaldehyde are continuously reacted in a stirred pot in the presence of the catalyst under conditions including a residence time of 3 minutes to 4 hours, a temperature of 70° F. to 250° F., and a pressure sufficient to maintain at least a portion of the reactants in the liquid phase. Water is removed from the vapor phase which is withdrawn, and the remainder of the vapor phase is recycled to the reaction zone.

The reaction mass is withdrawn and settled to obtain an acid phase and a hydrocarbon phase, and the hydrocarbon phase is separated by decantation and neutralized (e.g., by adding sodium carbonate).

The neutralized hydrocarbon phase is fractionated under a vacuum (e.g., at a pressure of 5 to 150 mm. Hg absolute), and a bottom-of-tower temperature of 200° C. to 250° C.

A bottoms products boiling above 600° F. (corrected to 760 mm. Hg) is recovered which contains from 13 to 17 wt. percent (preferably about 16 wt. percent combined oxygen). Two suitable xylene-formaldehyde condensation products are shown in the following Table I.

TABLE I.—TYPICAL PROPERTIES OF XYLENE-FORMALDEHYDE CONDENSATION PRODUCT

| Molecular Weight | 510 | |
|---|---|---|
| Specific Gravity, 60/60° F | 1.097 | 1.079 |
| Oxygen Content, wt. Percent | 16.1 | 16.9 |
| Viscosity, S.S.U. at 210° F | 150 | 92 |
| Color, Gardner | 1 | 9 |

As can be seen by the above table, the viscosity and color can vary somewhat even at approximately the same oxygen content and specific gravity. The oxygen content is generally improved by increasing the cut-point; i.e., by recovering a bottoms product boiling above 665° F. (corrected) instead of 600° F. (corrected) the oxygen content can be increased.

Phenol incorporation reaction

The xylene-formaldehyde condensation product is modified "advanced" by the incorporation of phenol, by heating the condensation product and phenol at a temperature between 40° F. and 280° F. for a length of time suitable to produce the desired viscosity in the "advanced" resin. The temperature and time employed in this stage is dependent upon the quantity of catalyst used, and upon the extent of prepolymerization (ultimate viscosity is a measure) that is desired. During this stage of the reaction, the molecular weight increased, as is evidenced by the increase in viscosity. The reaction may be stopped at the desired time by the addition of a stoichiometric quantity of potassium hydroxide or other base dissolved in a suitable solvent such as methanol.

As exemplary of how the time and temperature are variable, a resin was prepared using as a catalyst 1% by weight of xylene sulfonic acid and reacted at 40° F. for 64 hours. At the end of this time, the viscosity as measured with the Brookfield viscometer at 80° F. was 2000 centipoise. A similar mixture was prepared and was held at 120° F. for 10 minutes. At the end of the 10 minutes, the viscosity of the resin measured in the viscometer was again 2000 centipoise at 80° F.

In another experiment, a resin was held at 75° F. for 64 hours, at which time the viscosity at 80° F. was 32,000 centipoise. In a duplicate experiment, the same reactants were held at 125° F. for 30 minutes, at which time the viscosity had again reached 32,000 centipoise. In a third experiment, the same mixture of condensation product and phenol was mixed with 0.05% xylene sulfonic acid and was held at 220° F. for various periods of time, at the end of which the reaction was stopped by the addition of alcoholic potassium hydroxide, the alcohol boiled off, and the resin cooled to 80° F. The viscosity as measured at 80° F. with a Brookfield viscometer is shown below in Table II.

TABLE II.—INCREASE IN VISCOSITY WITH TIME

| Time, minutes | Brookfield viscosity at 80° F. |
|---|---|
| 5 | 1300 |
| 20 | 4300 |
| 40 | 21,500 |
| 60 | 110,000 |

Thus, it can be seen that considerable latitude is available with respect to the interchange of time, temperature, and catalyst concentration for preparing resins of the desired viscosity, and that the desired viscosity can be obtained under constant conditions of said concentration and temperature, by controlling the time of reaction.

As has been set forth above, the critical weight ratio of phenol to xylene-formaldehyde condensate is from 0.4 to 0.55 by weight. This is illustrated by a comparison of the acetone solubility of a number of resins prepared by the intercondensation of the xylene-formaldehyde condensate with varying amounts of phenol. The solubility of the thermoset product is an indication of the thermosetability of the resin, which, in the case of high oxygen content xylene-formaldehyde resin, is an indication of their suitability as a plywood adhesive.

In the tests shown in the table below, the phenol and xylene-formaldehyde condensation product were reacted in a beaker with 3% by weight xylene sulfonic acid (based on the total weight of phenol and xylene-formaldehyde condensate). The phenol, condensate, and acid were well mixed in a beaker and the mixture placed in an oven at 300° F. for 30 minutes. At the end of this time the reaction was complete. The solid material was removed from the oven, cooled, ground and dissolved in boiling acetone. The present acetone soluble material is an inverse indication of the degree of thermosetting for the material; that is, the more acetone soluble, the less thermoset.

TABLE III

| Phenol polyxyl ratio: | Percent soluble in boiling acetone |
|---|---|
| 1.00 | 98.7 |
| 0.735 | 35.2 |
| 0.6 | 9.42 |
| 0.5 | 3.27 |
| 0.4 | 4.09 |
| 0.368 | 6.59 |
| 0.30 | 23.8 |
| 0.25 | 32.17 |
| 0.125 | 59.83 |

It is seen from Table III that a minimum in acetone solubility occurred at the phenol-to-xylene-formaldehyde condensate ratio at about 0.5, and was at essentially this minimum within the range from about 0.4 to about 0.55. Experiments in using the various phenol-to-polyxyl ratios in plywood adhesives have confirmed that at a phenol-to-condensate ratio less than 0.4, or above about 0.55, the adhesive qualities are not satisfactory.

The neutral adhesive can be stored indefinitely. When desired for use, from 3 to 5 wt. percent (based on adhesive) of an acid catalyst (such as xylene sulfonic acid) is added and the adhesive is spread and thermoset. The viscosity of the adhesive may be lowered for spreading by adding from 1 to 5 wt. percent (based on adhesive) of an alcohol such as methanol or another solvent, such as a ketone, naphthenes, aromatic hydrocarbons, etc.

In its most specific aspect, as above stated, the present invention relates to the preparation of a plywood adhesive. The evaluation of adhesives for plywood use is governed by the Department of Commerce specifications for Douglas fir plywood as set out in CS 45–60. Coupons are tested by pulling apart and inspecting to see whether the wood failed or whether the glue failed. A 100% wood failure indicates that the glue did not fail at all. The adhesives of the present invention were tested by using a mechanical spreader to coat both sides of a one-tenth inch thick fir veneer core at the rate of 15 pounds per thousand square feet of double glue line (15#/MDGL), and the core was faced on each side with one-tenth inch thick fir veneer faces. The entire assembly was placed in a hot press where it was pressed at about 2000 pounds per square inch and 300° to 315° F. for 3 minutes. The panels were slowly cooled to room temperature after pressing.

The resulting plywood was then cut into coupons, boiled, and tested in accordance with the plywood glue line shear test of CS 45–60 to determine the percent wood failure which could be obtained. The Department of Commerce specification requires a minimum average of 80% wood failure for commercial board, but it will be understood that the adhesive which produces less than 80% wood failure can be used in producing the so-called "mill-certified plywood."

Both aspects of the present invention, however, have produced plywood which meets the Department of Commerce specifications. The blend of high and low viscosity adhesives, however, was more consistent in producing plywood panels which met the Department of Commerce specifications.

The following examples show in detail the formulation of the adhesive and the results of coupon testing in accordance with CS 45–60.

EXAMPLE 1

A xylene-formaldehyde condensation product (AF–415) having an oxygen content of about 13.8 wt. percent oxygen and a viscosity of about 348 SSU at 210° F. was combined with phenol at a phenol-to-condensate ratio by weight of 0.5 and reacted in the presence of 1.0 wt. percent xylene sulfonic acid (based on total reactants). The reaction was accomplished at 120° F. at atmospheric pressure for a time period of approximately 20 minutes to obtain an advanced phenol-xylene-formaldehyde intercondensation product having a viscosity of about 10,600 centipoise at 80° F. The reaction was stopped by the addition of a stoichiometric amount of potassium hydroxide in a methanol solution.

The neutral product was then admixed with an acid catalyst (xylene sulfonic acid) in a concentration of 4% by weight, based on the reaction product, and was spread on both sides of a plywood core at the rate of 15#/MDGL. The veneer faces were assembled 24 hours prior to pressing at 200 pounds per square inch and 300° F. for 3 minutes, followed by slow cooling.

The plywood was then cut into coupons and tested according to Department of Commerce Bulletin CS 45–60. The resultant tests indicated an average wood failure of 86%, fully satisfying the requirements of the Department of Commerce for exterior grade Douglas fir plywood.

EXAMPLE 2

Plywood adhesives of differing viscosity were prepared by the same process as set forth in Example 1, the viscosity being controlled by the time of the reaction employed during advancing of the resin. A number of blends of high and low viscosity adhesives were prepared and plywood manufactured with each blend. After testing for wood failure, the following data were obtained.

TABLE IV

| Viscosity (cps.) | | Weight Ratio | Percent Wood Failure at Assembly Time of— | |
|---|---|---|---|---|
| Low | High | | 1 Hour | 24 Hours |
| 2,400 | ------ | 1:0 | 47 | 75 |
| 2,400 | 16,300 | 1:4 | 65 | 84 |
| 2,400 | 128,000 | 1:4 | 68 | 93 |
| 2,400 | Solid | 1:⅛ | 71 | 88 |
| 10,600 | ------ | 1:0 | 73 | 86 |
| 10,600 | 31,500 | 1:½ | 91 | 87 |
| 10,600 | 31,500 | 1:1 | 83 | 92 |

From the above table it can be seen that the percent wood failure, particularly in the case of the 2400 centipoise viscosity adhesive, was improved by forming a blend of the low viscosity adhesive with an adhesive of substantially higher viscosity. In the case of the blend of 2400 centipoise adhesive with the 16,300 centipoise adhesive, the percent wood failure after 24 hours' assembly time was improved from 75% to 84%. When blended with 128,000 centipoise adhesive, wood failure increased to 93%.

In the case of the 10,600 centipoise adhesive, the two blends with ½ and 1 part of 31,500 centipoise adhesive gave an improvement in the 1-hour assembly time wood failure from 73 to 83 and 91%, respectively, while raising the 24-hour assembly time wood failure from 86% to 87 and 92%, respectively.

Thus, it is seen that the effectiveness of the adhesive can be improved by making a blend of the high viscosity adhesive with the low viscosity adhesive.

Having disclosed in detail the essence of the present invention, what is intended to be covered by Letters Patent should be limited not by the specific examples herein given, but rather by the appended claims.

We claim:
1. A thermosetting plywood adhesive for use with an acid catalyst consisting essentially of
   the interreaction product of
   a xylene-formaldehyde condensation product having an oxygen content of 13 to 17 wt. percent, a molecular weight of 250 to 850, and a viscosity of about 100 to 600 SSU at 210° F.
   with phenol,
   at a phenol-to-condensation product weight ratio from 0.4 to 0.55,
   said interreaction product having an oxygen content of about 15.4 to about 12.2 wt. percent and a viscosity of 600 to 1,500,000 centipoise at 80° F.,
   said plywood adhesive having an essentially neutral pH.
2. A plywood adhesive in accordance with claim 1 wherein the phenol-to-condensation product weight ratio is 0.5.
3. A plywood adhesive in accordance with claim 1 wherein the adhesive is a blend of an adhesive having a viscosity of 600 to 10,000 centipoise at 80° F., and an adhesive having a viscosity of 15,000 centipoise to solid at 80° F.
4. A plywood adhesive in accordance with claim 3 wherein the blend consists of
   one part by weight of an adhesive having a viscosity of 2400 centipoise at 80° F. and
   from one-eighth to 4 parts by weight of an adhesive having a viscosity from 16,300 centipoise at 80° F. to a solid at 80° F.
5. A plywood adhesive in accordance with claim 3 wherein the blend consists of
   one part by weight of an adhesive having a viscosity of 10,600 centipoise at 80° F.
   and from one-half to one part by weight of an adhesive having a viscosity of 31,500 centipoise at 80° F.
6. A method of making a resin having utility as a plywood adhesive which comprises
   reacting a xylene-formaldehyde condensation product having an oxygen content of 13 to 17 wt. percent, a molecular weight of 250 to 850, and a viscosity of about 100 to 600 SSU at 210° F.
   with phenol,
   at a phenol-to-condensation product weight ratio from 0.4 to 0.55,
   in the presence of an acid catalyst
   at a temperature of 40° F. to 280° F.
   for a time sufficient to obtain a reaction product having an oxygen content of about 15.4 to 12.2 wt. percent and a viscosity of 600 to 1,500,000 centipoise at 80° F.,
   and stopping the reaction by adding a stoichiometric amount of base, said stoichiometric amount being based on the amount of acid catalyst present.
7. A method in accordance with claim 6 wherein the phenol-to-condensation product weight ratio is 0.5.
8. A method of making an improved plywood adhesive which comprises
   reacting a first portion of a xylene-formaldehyde condensation product having an oxygen content of 13 to 17 wt. percent, a molecular weight of 250 to 850, and a viscosity of about 100 to 600 SSU at 210° F.
   with phenol,
   at a weight ratio of phenol to condensation product within the range from 0.4 to 0.55 by weight,
   in the presence of an acid catalyst,
   at a temperature of 40° F. to 280° F.,
   for a time sufficient to obtain a reaction product having an oxygen content of about 15.4 to 12.2 wt. percent and a viscosity of 600 to 10,000 centipoise at 80° F.,
   and stopping the reaction by adding a stoichiometric amount of base, the stoichiometric amount being based on the amount of acid catalyst present to obtain a first adhesive having a substantially neutral pH,
   reacting a second portion of said xylene-formaldehyde condensation product with phenol, at a weight ratio of phenol-to-condensation product within the range of 0.4 to 0.55,
   in the presence of an acid catalyst,
   at a temperature of 40° F. to 280° F.,
   for a time sufficient to obtain a reaction product having an oxygen content of about 15.4 to 12.2 wt. percent and a viscosity of 10,000 centipoise to a solid at 80° F., and stopping the reaction by adding a stoichiometric amount of a base, the stoichiometric amount being based upon the amount of acid catalyst present to obtain a second product having a substantially neutral pH, and blending said first product with said second product in a ratio sufficient to obtain a blend having a viscosity within the range of 6000 to 100,000 centipoise at 80° F.

9. A method in accordance with claim 8 wherein the phenol-to-condensation product weight ratio is 0.5 for both said first portion and said second portion.

References Cited

UNITED STATES PATENTS

| | | | |
|---|---|---|---|
| 2,954,360 | 9/1960 | Krzikalla et al. | 260—57 |
| 2,987,498 | 6/1961 | de Jong. | |
| 3,053,793 | 9/1962 | Imoto et al. | 260—838 |
| 3,303,167 | 2/1967 | Kakiuchi et al. | 260—57 |
| 3,347,952 | 10/1967 | Tanaka et al. | 260—838 |

MURRAY TILLMAN, *Primary Examiner.*

J. C. BLEUTGE, *Assistant Examiner.*